TRANSISTOR MEANS FOR OBTAINING THE PRODUCT OF TWO INPUTS

Filed Oct. 29, 1959

INVENTOR
frank bregman
BY [signature]
AGENT

United States Patent Office 3,075,090

Patented Jan. 22, 1963

3,075,090

TRANSISTOR MEANS FOR OBTAINING THE PRODUCT OF TWO INPUTS

Frank Bregman, Eindhoven, Netherlands, assignor to North American Philips Company Inc., New York, N.Y., a corporation of Delaware Filed Oct. 29, 1959, Ser. No. 849,510
Claims priority, application Germany Dec. 2, 1958
5 Claims. (Cl. 307—88.5)

The present invention relates to product circuit arrangements for push-pull modulation, frequency-shifting or phase-comparison of electrical oscillations by means of a transistor. As is known, four rectifiers arranged in the form of a ring permit an output oscillation to be produced, which corresponds to the product of two input oscillations supplied to the ring. One input oscillation may, for example, be an unmodulated carrier wave and the other oscillation may be a modulating wave, so that the product oscillation is a modulated carrier wave of the two iinput oscillations. However, the two input oscillations may alternatively have, for example, neighbouring frequencies and by filtering, for example, the difference frequency out of the product oscillation a frequency shifted oscillation results. Alternatively, the two input oscillations may have the same frequency, and the low frequency component or direct current component may be derived from the product oscillations, which then is a measure of the phase-difference between the two input oscillations.

By symmetrical arrangement of the ring-modulator the frequency components of the two input oscillations obtained in the output oscillation may entirely or for the greater part be suppressed. The present invention has for its object to obtain the same result with the use of only one preferably symmetrical transistor. A circuit arrangement for modulation or phase-comparison of two input oscillations by means of a symmetrical transistor is known per se. One oscillation is applied between the main electrodes (emitter and collector, and vice versa), the other oscillation is applied between one of the main electrodes and the base of the transistor. In this case, however, the frequency component of the first-mentioned oscillation is not suppressed in the output signal.

The present invention is characterized in that one oscillation is applied between the point of reference potential and the base of the transistor, while the other oscillation, the amplitude of which exceeds that of the first-mentioned oscillation, is applied in push-pull to the transistor main electrodes with regard to said point of reference potential. Preferably, a transistor of symmetrical type is used, the main electrode circuits of which include equal resistors; the output signal is center-tapped from a voltage divider which is connected between one main electrode and the remote end of the resistor connected to the other main electrode.

Figure 1:
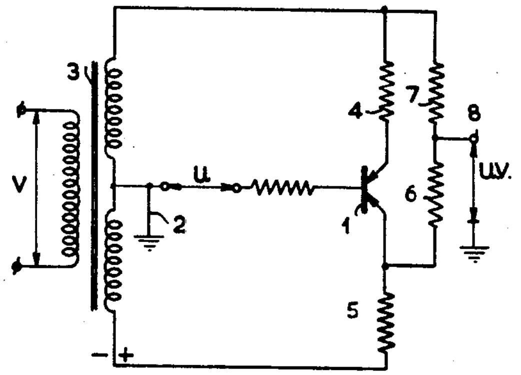
Figure 2:
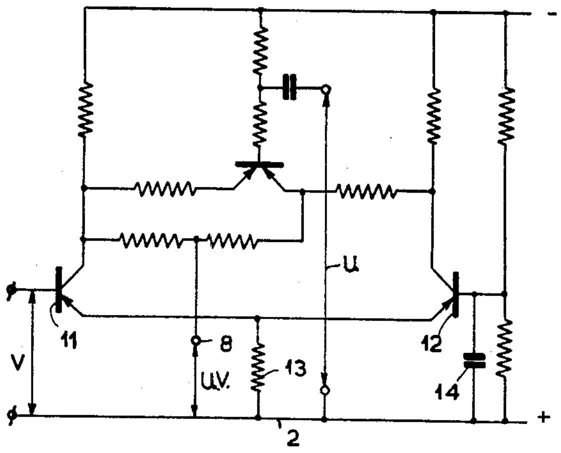

In order that the invention may be readily carried into effect an example will now be described in detail with reference to the accompanying drawing, in which FIG. 1 shows a basic circuit diagram according to the invention, and FIG. 2 is a modification of FIG. 1.

The circuit arrangement shown in FIG. 1 comprises a transistor which is represented as a p-n-p junction transistor, preferably of symmetrical type so that, if one main electrode is biased as an emitter and the other main electrode as a collector, the same emitter-collector current amplification factor is found as if the first-mentioned main electrode were biased as a collector and the last-mentioned main electrode as an emitter. One signal oscillation U is applied between a point 2 of reference potential and the base of the transistor. The other signal oscillation V is applied through a transformer 3 in opposite phase, in series with resistors 4 and 5 respectively, between the reference point 2 and either main electrode of the transistor 1.

The oscillation produced in the secondary winding of the transformer 3 has an amplitude exceeding that of the signal oscillation of the source U. In the phase of the source V, in which the upper terminal of the transformer 3 is negative with respect to its lower terminal, the upper main electrode of the transistor 1 acts as a collector, the lower main electrode as an emitter. In this case, the transistor 1 operates as an emitter-follower circuit with regard to the signal source U and consequently produces across the resistor 5 a voltage substantially corresponding to that of the source U. Upon polarity reversal of the source V, the upper main electrode of the transistor 1 is operated as an emitter-electrode and the lower main electrode as a collector-electrode. Since the resistors 4 and 5 have the same value and the transistor is of the symmetrical type, the voltage then set up across the resistor 5 again substantially corresponds to that of the signal source U but is of opposite phase. The output signal UV is center-tapped from a voltage divider 6, 7 connected between one main electrode and the end of the resistor 4 remote from the other main electrode. By this arrangement the frequency component of the output signal UV having the frequency of the source V is likewise suppressed. If the transistor is not of the symmetrical type, the resistors 4 and 5 and/or the resistors 6 and 7 should accordingly be given different values.

The frequencies of the signals U and V may differ so that a modulated or frequency-shifted oscillation can be taken from the output. The frequencies of the oscillations U and V may alternatively be the same so that the low frequency component or direct current component of the output signal is proportional to the phase difference between these two oscillations U and V.

FIG. 2 shows a modification of FIG. 1, in which the input transformer 3 is omitted. For this purpose, provision is made of further transistors 11 and 12 comprising a common emitter-resistor 13. The signal oscillation V is supplied to the base of the transistor 11, while the base of the transistor 12 is connected to the point of reference potential 2 through a decoupling capacitor 14. The oscillations having the frequency of a signal V and produced at the collectors of transistors 11 and 12 are subsequently supplied to a circuit arrangement identical to that shown in FIG. 1 so as to produce again the product oscillation UV at the output terminal 8. Any direct voltage components present in the signals U and V are maintained in the product oscillation UV.

What is claimed is:

1. A product circuit arrangement for producing a signal corresponding to the product of two input oscillations comprising: a transistor having two main electrodes and a base electrode, means for applying one input oscillation between a point of constant reference potential and said base electrode, means for applying a second input oscillation having an amplitude greater than said one input oscillation to said main electrodes, said second input oscillation being applied in push-pull relative to said point of reference potential, a first resistor connected to one main electrode and a second resistor connected to the other main electrode, a center-tapped voltage divider having one end connected to one main electrode and the other end to the point of the resistor connected to the other main electrode remote from said other main electrode, and means for deriving an output signal from said center tap.

2. A product circuit arrangement for producing a signal corresponding to the product of two input oscillations comprising: a transistor having two main electrodes and a base electrode means for applying a first input oscillation between a point of constant reference potential and said base electrode, a transformer having a primary winding inductively coupled to a first and second secondary winding, one end of each of said secondary windings being directly connected to said point of constant reference potential, the other end of the first secondary winding being coupled to one main electrode through a first resistor, the other end of the second secondary winding being coupled to the other main electrode through a second resistor, means for applying a second input oscillation to said primary winding, said second input oscillation having an amplitude greater than said first input oscillation, a center-tapped voltage divider having one end connected to one main electrode and the other end to the point of the resistor connected to the other main electrode remote from said other main electrode, and means for deriving an output signal from said center tap.

3. A circuit arrangement as claimed in claim 1, further comprising two additional transistors each having base, emitter and collector electrodes and a common emitter resistor, the base electrode of one of said additional transistors being coupled to said point of reference potential, said second input oscillation being coupled between the base electrode of the other additional transistor and said point of reference potential.

4. A circuit arrangement as claimed in claim 1, wherein said first and second resistors have the same resistance value and said transistor is of the symmetrical type.

5. A circuit arrangement according to claim 2, wherein said first and second resistors have the same resistance value and said transistor is of the symmetrical type.

References Cited in the file of this patent

UNITED STATES PATENTS

| | | |
|---|---|---|
| 2,486,776 | Barney | Nov. 1, 1949 |
| 2,843,745 | Smith | July 15, 1958 |
| 2,870,413 | Cluwen | Jan. 20, 1959 |
| 2,914,665 | Linder | Nov. 24, 1959 |
| 2,926,296 | Pinckaers | Feb. 23, 1960 |
| 2,937,342 | Wellman | May 17, 1960 |
| 2,939,916 | Miller | June 7, 1960 |
| 2,943,271 | Willis | June 28, 1960 |